F. P. BERGH, H. J. LOEBINGER & H. C. NEUBERGER.
PROCESS OF EVAPORATING FLUIDS.
APPLICATION FILED NOV. 24, 1908.
997,950.
Patented July 18, 1911.
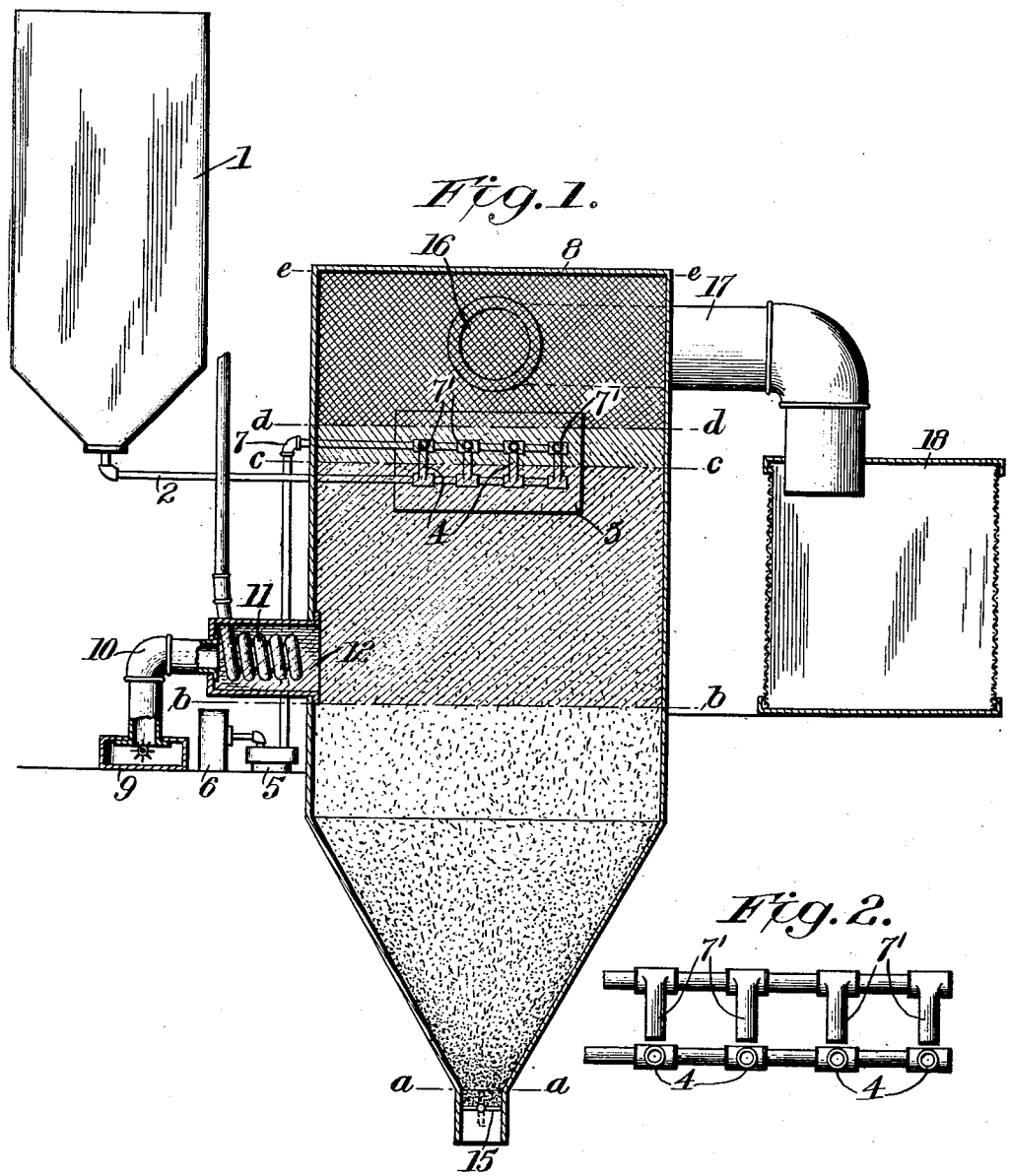

UNITED STATES PATENT OFFICE.

FREDERICK P. BERGH, HUGO J. LOEBINGER, AND HENRY C. NEUBERGER, OF NEW YORK, N. Y., ASSIGNORS, BY MESNE ASSIGNMENTS, TO GENERAL REDUCTION COMPANY, OF NEW YORK, N. Y., A CORPORATION OF NEW YORK.

PROCESS OF EVAPORATING FLUIDS.

997,950.  Specification of Letters Patent.  Patented July 18, 1911.

Application filed November 24, 1908. Serial No. 464,257.

*To all whom it may concern:*

Be it known that we, FREDERICK P. BERGH, HUGO J. LOEBINGER, and HENRY C. NEUBERGER, citizens of the United States, residing at New York, in the county of New York and State of New York, have invented certain new and useful Improvements in Processes of Evaporating Fluids, of which the following is a specification.

This process is one for general evaporation, whereby fluids hot or cold containing in solution, suspension or emulsion a solid, viscid or oily content can be reduced in volume to any required extent down to the solid, viscid or oily content by the evaporation of the solvent or vehicle in part or in whole.

Our invention is applicable to the separation of the constituent solids of milk and cream from the water contained therein, to the separation of the solids from blood, bile and similar animal substances, to the extraction of sugar, glucose, vegetable dyes and other substances from the vegetable juices, and also to the separation of various minerals from the liquids in which they are held, as mineral waters, salts from briny solutions, and metallic salts from their solutions, and also in addition to the treatment of the crude or raw materials of the general classes above enumerated, to the separation of the solids of artifically prepared mixtures for the purpose of isolating or refining certain substances desired to be obtained, as in the refining of sugar, and obtaining metals from their slimes, and the invention is also applicable to the partial evaporation of the fluid to form crystallizing solutions.

The invention is also applicable to certain cases where, co-incident with the evaporation, a chemical reaction is desired.

This process broadly stated consists of the formation in a closed chamber of a stratum of air or other gas which performs the evaporation and which has maintained above it a stratum of effluent vapor, air or other gas of a temperature differing from that of the evaporating stratum and below it, a stratum of air or other gas in a comparative state of rest also of a temperature differing from that of the evaporating stratum, in which lowest, quiet stratum concentrated products may be collected. By this process, economy of heat and other energy is effected, rapidity of evaporation is secured and in the case of certain organic substances, destructive change is minimized or precluded. These steps are carried out as follows: the fluid to be evaporated is converted into spray by an atomizing device which injects the spray into a closed chamber in a horizontal sheet or layer at a level below the top and above the bottom of the chamber—if the chamber is rectangular or polygonal the atomizing device is placed on one side. Above this level is the effluent stratum formed between the top of the chamber and the layer of the atomized fluid and preserved by the maintainance of the middle or evaporating stratum below it. At an angle to the direction of the flow of the spray and also at an angle to the movement of the evaporating body of air or other gas of less specific gravity than the atomized body is an opening at or near the top of the chamber sufficient to take off the effluent vapor and admitted air or other gas. By the size of this opening the velocity of the effluent may be regulated so as not to disturb the stratification. Below the level of the atomizer and above the bottom of the chamber and at an angle to the projection of the spray and also at an angle to the line of flow of the effluent, is injected into the chamber also in a horizontal sheet or layer a volume of air or other gas of such temperature, amount and velocity as to cross the chamber, to perform the evaporation by rising through difference in specific gravity to strike the spray and to form the lower boundary of a middle stratum of air or other gas in the chamber. By reason of the formation and maintenance of this middle stratum by the sheet of spray on top and by the incoming vaporizing air or other gas below of different specific gravity from the air or gas within the chamber there is formed below the level of the vaporizing air or other gas, another stratum of a temperature differing from that of the middle or vaporizing stratum above it into which may be collected concentrated products for further treatment or withdrawal. The temperature and other conditions of this stratum may be varied by separate and special devices to suit the product in process. Between the level of the atomized fluid and the lower boundary of the volume of air or other gas admitted below the atomization, the evaporation takes place with the economy, rapidity and immunity referred to. The admission of the various bodies of air or other gas and of the fluid and the exit of the effluent are of course constant, continuous and synchronous.

In carrying out the process, the apparatus hereinafter described and illustrated in the accompanying drawings may be employed, although it is obvious that various other forms of devices may be employed to practice the method.

In these drawings Figure 1 is a side elevation, partly in vertical section, of the apparatus, and Fig. 2, a detail plan of the atomizer.

Referring to the drawings, 1 is a container vessel adapted to hold the liquid to be separated and 2 is a pipe leading from this container to an atomizing device 3 provided with a series of nozzles 4 through which the liquid is forced. An air tank 5 communicating with an air compressor 6, is connected by a pipe 7, having nozzles 7′ enabling air forced through the pipe 7 to meet the emerging liquid and convert it into a fine spray. The atomizer is located in the upper part of a vessel 8, which forms a separating and settling chamber. The atomizing device is located adjacent to the rear wall of the vessel 8 and the air nozzles 7′ extend in a horizontal direction as shown from such rear wall so as to project the atomized spray across the area of the chamber 8 at such velocity as to maintain the spray in a horizontal layer, while at the same time so as not to strike the opposing wall with such force as to cause a rebound and break up such formation.

A current of air or other gas, of large volume, preferably heated, is admitted to the vessel 8 below the atomizer. For this purpose a blower 9 is suitably mounted outside of the vessel and is adapted to draw air or other gas in and force it through a pipe 10 and against and over a heater 11 when it is found desirable to heat the air or other gas. This heater may consist of a coil of steam pipes to which steam may be admitted from any suitable source. From this heater the air enters the vessel 8 through an opening 12. The direction of the moving body of air or gas admitted through this opening is at an angle to the direction at which the moving body of spray is projected and at such an angle as to avoid adding the propulsive force of the spray to the force of the gaseous body, thereby avoiding an undue velocity in said latter body and, at the same time, insuring a more intimate contact of the air or gas with the particles of spray. The cross area of the entrance port 12 is considerably greater than the cross area of the pipe 10, whereby the velocity of the air or other gas admitted from the pipe is reduced as it enters the chamber so that this vaporizing body of air or gas will move into and across the chamber at such a comparatively low velocity as to merely occupy the space below the atomizer so as, in conjunction with the superposed body of spray driven across the chamber at an angle to the direction of the moving gaseous body, to create a stratum, thereby avoiding carrying the air or gas with such force against the opposing wall as to cause a rebound that will create a disturbance of and intermingling with the gas, air or vapor above and below said vaporizing body.

At the upper end of the vessel above the atomizer and on a line at an angle, preferably at right angles to the direction of the vaporizing current of air as it enters the chamber is an exit port 16 through which the effluent vapors and air are permitted to pass, which exit is of sufficient size to allow the escape of all the gaseous effluent without disturbing the stratification within the chamber. This exit is also so situated that the effluent passing therethrough moves counter to the direction of the projected body of spray. This port communicates with a pipe 17 leading to a vessel 18, the wall of which may be made of gauze or similar permeable material to permit the vapor to escape and to retain solid matter, or the wall may be made of impermeable material for the purpose of condensation and collection.

The lower portions of the walls of the vessel 8 may be sloping as shown, in order to form at the bottom of the vessel a collection chamber for the concentrated products which may be drawn off through a suitable opening. For some purposes this opening may be at the bottom in which a revolving gate 15 may be mounted.

The maintenance of the vaporizing body of air or gas in the stratum and the difference in specific gravity of such air or gas from that within the chamber below the stratum, whereby the upper air or gas rises against the spray, serves to define and maintain the lowest stratum before described. This difference in specific gravity may be effected for instance, by imparting a higher temperature to the vaporizing body or, as another example, a positive cooling of the lower zone may be effected by suitable refrigerating means surrounding the lower part of the chamber or by other suitable means.

In the drawing the various strata are indicated by shade lines. The space from *a* to *b* is occupied by the lowermost stratum which receives the concentrate. From *b* to *c* is the stratum formed by the vaporizing gaseous body, the current of which moves across the chamber in the direction of the arrow $x$, and which has a rising action against the spray due to its less specific gravity. The stratum formed by the layer of spray lies between the lines $c$—$d$, the projection of the spray being toward the front of the chamber as viewed in the drawing, at right angles to the entering direction of the vaporizing gas. The vapor and other effluent above the atomizer form an uppermost stratum lying between the lines $d$—$e$.

This process may be employed for partial as well as complete evaporation. In both partial and complete evaporation the required degree of concentration or evaporation is obtained by regulating either the amount of fluid supplied by the atomization or the volume of temperature of the vaporizing air or other gas or the character and size of the effluent exit or by the regulation of all of these together. The concentrated products fall into and through the lowest stratum to the bottom of the chamber for withdrawal or for further treatment.

In applying this process to the evaporation of an emulsion like whole milk, the advantages outside of the economy of energy and time are shown in the temperature at which the evaporation can be conducted, the prompt action of the vaporizing air striking the fine particles of the emulsion counter to their projection, whereby oxidation is reduced by the short exposure and the concentrate dropped into a zone of air of a reduced temperature in which the solid particles are kept in the condition formed at the time of the evaporation. These advantages are also conspicuous in the evaporation of skimmed milk and cream separately.

The advantages of this process are made up of features peculiar to this process in combination with others belonging to it but in common with other processes. By the formation and maintenance of strata due to the use of counter currents of carefully adjusted velocity there is a utilization of energy substantially without waste, there is also provision within the apparatus by the formation of the lowest stratum or zone for quick removal of the required concentrate beyond the action of any of the energy used to effect the separation or evaporation. By the formation and maintenance of strata or zones of air or other gas in comparative rest, whereby the evaporating medium can be used counter to the substance treated without the formation of vortex and by the substance to be separated being in finely divided form and the evaporating or separating medium applied against its line of projection, particularly rapid work is effected under moderate physical conditions which in certain organic substances result in comparative freedom from destructive change in the required product. The apparatus or plant needed is both cheap and simple, easy of adjustment to the sort of work contemplated and capable of regular and close regulation, the total energy used being applied in opposition to the material to be separated or evaporated and that material being put in the best condition to be acted upon, rapid and economic work follows in consequence and any energy not fully used in this step can be applied in the initial steps to the greater advantage of the principal action. By the easy control and adjustment of energy used in this process a wide range of substances can be treated, from organic substances which are rapidly decomposed, to inorganic which need and can stand severe treatment. By the formation and maintenance of strata chemical changes and reactions can be performed with facility and economy in the same apparatus and at the same time at which the separation or evaporation is going on. This process may be applied to the purification of gas for the separation of constituent or mechanical impurities.

To fluids containing liquid constituents of marked difference of specific gravity this process is successfully applicable—the more volatile constituents pass off with the effluent and the heavier are deposited into the quiet zone at the bottom of the chamber. In brief, by the formation and maintenance of strata, rapidly moving particles, solid, liquid and gaseous, are brought into a state of comparative rest long enough to effect the desired separation and the separated constituents at once pass on by reason of their different specific gravities to their respective destinations for further treatment. This process is also particularly adapted to the production of a definite concrete product from solutions previously mixed or blended for any desired purpose. When the process is applied to such mixture the result is a concentrate or finished product, the solid constituents of which are thoroughly and closely commingled with the subsequent freedom from decomposition or change.

The apparatus shown herein together with certain added features is set forth and claimed in our pending application Serial Number 621,142.

We claim:

1. The process of evaporation for fluids containing in solution, suspension or emulsion, a solid, viscid or oily content, which consists in converting the fluid into an atomized condition in a suitable chamber, subjecting the atomized liquid to a stratum of moving gaseous matter of less specific gravity than the atomized fluid and below the level of the atomized fluid, while maintaining in separate strata gaseous bodies above and below the vaporizing stratum, whereby the heat of the vaporizing body is fully utilized and destructive changes in the products avoided.

2. The process of evaporation for fluids containing in solution, suspension or emulsion, a solid, viscid or oily content which consists in projecting the fluid in an atomized layer, passing in a stratum a moving gaseous body of less specific gravity than the atomized fluid below said layer to vaporize, while maintaining the effluent above the atomized layer and the gaseous matter below the vaporizing stratum in strata separate from the vaporizing stratum, and constantly leading off the effluent at a rate to prevent breaking up the stratification.

3. The process of evaporation for fluids containing in solution, suspension or emulsion, a solid, viscid, or oily content which consists in converting the fluid into a layer of spray, subjecting the spray to a vaporizing gaseous layer below the level of the spray and whose particles move across and at an angle to the direction of the spray and leading off the effluent above the spray and in a direction different from the directions of movement of the spray and of said vaporizing gaseous body.

4. The process of evaporation for fluids containing in solution, suspension or emulsion a solid, viscid or oily content which consists in projecting the fluid in an atomized layer across a chamber, passing below the spray and at such an angle to the direction thereof as not to add its propulsive force to that of the spray a moving gaseous body of a velocity insufficient to cause a rebound from the chamber wall and of less specific gravity than the spray and constantly leading off the effluent at a rate equal to the rate of inflow of atomizing and gaseous matter and the formation of vapor.

5. The process of evaporation for fluids containing in solution, suspension or emulsion, a solid, viscid or oily content which consists in converting the fluid into a spray, subjecting the spray to a vaporizing gaseous stratum below the level of the spray whose particles move at an angle to the projection of the spray and which stratum is above another stratum of gaseous matter, and leading off the vapor and other effluent in a different direction from the directions of movements of the spray and of the vaporizing body.

6. The process of evaporation for fluids which consists in projecting the fluid in the form of a layer of spray, and passing a current of gaseous matter maintained in a stratum and of less specific gravity than the spray across the space below the layer of spray and in a direction substantially at a right angle to the projected movement of said spray.

7. The process of evaporation for fluids containing in solution, suspension or emulsion, a solid, viscid or oily content which consists in converting the fluid into a layer of spray, subjecting the spray to a heated gaseous stratum below the spray whose particles move across and at an angle to the projection of the spray, and leading of the vapor and other effluent in a direction different from the movement of the gas in said stratum, while maintaining during the evaporation a gaseous stratum below the vaporizing stratum.

8. The process of evaporation for fluids containing in solution, suspension or emulsion, a solid, viscid or oily content which consists in projecting the fluid in the form of a layer of spray, carrying against the said spray a moving body of vaporizing gas maintained in a stratum below the spray, and depositing the concentrated product into a stratum of cooler gas below the vaporizing stratum.

9. The process of evaporation for fluids containing in solution, suspension or emulsion, a solid, viscid or oily content, which consists in projecting the fluid in the form of a layer of fine spray, bringing said spray into contact with a heated moving gaseous body maintained in a stratum below the layer of spray to vaporize the spray and depositing the concentrated product into a cooler stratum of gas immediately below the heated gaseous stratum, whereby the product is instantaneously removed from the heated stratum and cooled.

10. The process of separating solids from liquids which consists in converting the liquid into a fine spray projected in a substantially horizontal direction, subjecting the spray to a lower gaseous current of less specific gravity than the spray and moving substantially in a horizontal direction and at an angle to the spray, leading the vapor off in a direction different from the directions of movements of said gaseous current and layer of spray and depositing the concentrated product into a zone of cooler gas below the current of vaporizing gas.

11. The process of evaporation for fluids containing in solution, suspension or emulsion, a solid, viscid or oily content which consists in converting the fluid into an atomized condition in a suitable chamber, establishing an upper stratum of a moving gaseous vaporizing body, below the level of atomization and a gaseous stratum of lower temperature below the vaporizing stratum within said chamber, depositing for collection in a receptacle the concentrated product into and through the lower stratum, and leading off the vapor in an effluent body uncommingled with the moving body of vaporizing gas or the descending body of the concentrated product.

12. The process of evaporation for fluids containing in solution, suspension or emulsion, a solid, viscid or oily content which consists in converting the fluid into a spray, subjecting the spray to a vaporizing gaseous stratum whose particles move across and at an angle to the spray and which is below the level of said spray, depositing the concentrated product into a stratum of gaseous matter cooler than the temperature of the vaporizing body and below said vaporizing stratum, for collection, and leading off the vapor and other effluent at an angle to the vaporizing movement of the body and also to the direction of the spray.

In testimony whereof we affix our signatures, in presence of two witnesses.

FREDERICK P. BERGH.
HUGO J. LOEBINGER.
HENRY C. NEUBERGER.

Witnesses:
SOFIA McLOEBINGER,
WILLIAM S. M. JONES.